July 2, 1935.  O. O. RIESER  2,007,025

MOLDED PRODUCT AND METHOD OF PRODUCING IT

Filed April 24, 1931    2 Sheets-Sheet 1

INVENTOR.
Oliver O. Rieser
BY Allen & Allen
ATTORNEYS

July 2, 1935.   O. O. RIESER   2,007,025
MOLDED PRODUCT AND METHOD OF PRODUCING IT
Filed April 24, 1931   2 Sheets-Sheet 2

INVENTOR.
Oliver O. Rieser
BY Allen & Allen
ATTORNEYS.

Patented July 2, 1935

2,007,025

UNITED STATES PATENT OFFICE 2,007,025

MOLDED PRODUCT AND METHOD OF PRODUCING IT

Oliver O. Rieser, Oak Park, Ill., assignor to The Richardson Company, Lockland, Ohio, a corporation of Ohio Application April 24, 1931, Serial No. 532,556

3 Claims. (Cl. 41—25)

My invention relates to the manufacture of articles molded from plastic compositions, which articles are made to conform to and to present the likeness of a pattern or master article, which may be of a different composition or not, and/or have a surface finsh or appearance different from the natural appearance of the molded composition of which they are formed. My molded articles may be metallized or not. One field of usefulness of my invention is the reproduction in molded compositions of wood carvings or other wooden objects, and I shall describe my invention in an exemplary embodiment having to do with the manufacture of radio cabinets or similar articles from a master or original cabinet in wood, which is highly carved and ornamented. It will be understood throughout the following disclosure that my invention is not limited to the exemplary embodiment.

The general objects of my invention are the production of molded articles which are, so far as appearance goes, an exact reproduction of an original article which will usually be in another material; and the making of relatively inexpensive reproductions of a highly expensive original article.

Other objects of my invention are set forth hereinafter, or will be apparent to one skilled in the art, upon reading these specifications, I accomplish by that certain series of process steps and in those articles of which I shall now describe the exemplary embodiment aforesaid, reference being had to the drawings which form a part hereof.

In these drawings:—

Figure 1:
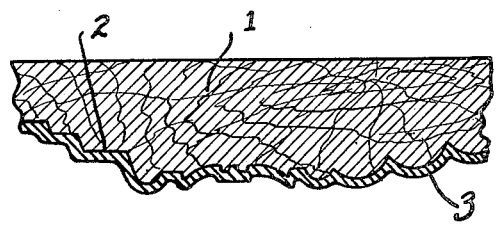
Figure 1 is a fragmentary sectional view of an original article or master copy, which has been coated with metal as a step in my process.

Broadly, in the practice of my invention, I provide a mold which is, as respects at least a particular portion of an original or master article, an exact counterpart thereof. I employ this mold to give a mass of plastic composition the desired configuration, and thereafter I finish the molded article to give the desired appearance, all by steps which I shall now fully describe.

I may start my process either with an actual article or a reproduction thereof, made by my process or some other. The original article may be of different kinds; it may be metallic or non-metallic. If it is metallic, the production of a suitable mold may be simplified, since it may be possible to form a mold portion directly against the article itself or a surface thereof as by casting, die-casting, or by pressing against a softer metal. If the article is non-metallic, I may use it as a pattern to make a casting in metal therefrom, which casting I subsequently employ as a mold in forming the desired reverse counterpart. Since a very great field of usefulness in my process is the making of reproductions in which all of the exceedingly fine surface configurations of the original are faithfully embodied in the reproduction, I shall describe my process in connection with the reproduction of wood carvings, in which I secure in my molded article not only the general contour, but also the chisel marks of the original carving, and the natural indentations and surface markings of the wood grain itself. Thus, my articles do not have a machine made appearance, but they possess all of the vitality and artistic merit of the original because they are an exact reproduction of every minute detail thereof.

In the making of this type of reproduction, I prefer to coat electrolytically the surface of the article with a layer of metal, which will exactly follow the surface and subsequently to remove this layer of metal and so to treat it that it may be used as a part at least of the molding surface in a mold. To coat the article with metal as aforesaid, the usual practice is to suspend it in a bath of electrolyte. Where the original or master article is of a composition which will be resistant to the electrolyte, I may proceed at once to "sensitize" or render its surface conductive, first, if necessary, treating the surface with some substance which will cause the sensitizer to adhere. Where the article is likely to be affected by the bath, it will be necessary first to treat it with some proofing substance, and in the treatment of wood carvings or carved wooden articles, I prefer to treat them with an oil or a substance of waxy characteristics. I have used a number of proofing substances with entire satisfaction. For example, I have secured excellent results with a mixture of sixty parts, by weight, of paraffin, sixty parts of beeswax, and twenty-five parts carnauba wax. This mixture is employed in a liquid state, and it is preferable not to coat the article with it, since a coating will tend to mask the delicate configurations of the surface. Accordingly, I prefer to immerse the article in a bath of the molten waxy substance, and to leave it there under the influence of heat until at least the surface has become impregnated so thoroughly as to resist the action of the electrolytic bath. Afterward, I remove the article and thoroughly drain it.

The article so treated will then be sensitized as aforesaid. This may be accomplished in several ways. The surface of the article may be dusted with graphite or some other finely divided conductive substance. I prefer, however, to employ a liquid sensitizer, which may be sprayed on the surface, since in this way I am enabled to work more rapidly, to secure more perfect coverage of the surface and to secure a continuously conductive coating, which nevertheless, is extremely thin. I prefer to employ an extremely fine metal powder, with a suitable carrier for spraying, and where I am to sensitize the surface of an impervious article such as bakelite, for example, or even the treated wood just described, or a metal article, I may coat the surface thereof first with a substance to which the bronze or metal powder will adhere to a very slight, but appreciable degree. Shellac dissolved in alcohol serves as a good coating substance. To make up a suitable spray of a sensitizing nature, say one pint, I may take six level teaspoons of the finest copper burnished bronze powder, two ounces of the so-called banana oil, or amyl acetate, the remainder being a cheap cleaning thinner. This gives me a substance which is very easily handled as a spray, but which forms a coating having very little cohesiveness due to the almost completely volatile character of my vehicle. The coating has, however, a correspondingly increased conductivity.

As hereinabove indicated, for proper adherence this coating should be placed over an article the surface of which may be softened sufficiently to retain the bronze sensitizing powder, or over an article the surface of which has been treated to give it this property. Molded asphaltic materials are suitable for the reception of this sensitizing treatment without any preliminary manipulation, but surfaces of impervious materials, such as bakelite, for example, should preferably be given a coating of some substance like shellac. The vehicle of my spray softens the surface of the article or the shellac or other coating thereon to a degree sufficient to cause it to hold bronze coating; and the article may then be transferred to the electrolytic bath for the deposition of a coating of metal thereon.

Hereinabove, I have indicated that an original article, such as a wood carving may be plated with metal for the production of a suitable molding surface. Where the quantity of reproductions to be made is so large as to require a plurality of molds, or where it is desired to preserve the original article from the chance of deterioration in the process steps hereinabove described, it is advantageous to make from the original one or more dummy articles to be carried through the plating steps. This may be done in a number of ways; but glue impressions offer a number of important advantages, one of which is that the original article need not be examined or treated for undercut places. In an exemplary process, I proceed as follows: The original article, at least as to that surface which is to be reproduced, is covered with paper or cloth as a protection, and a layer of water clay, in plastic condition, is placed thereon to a depth of, say half an inch over most parts, and a greater thickness over others, at least where an opening is to be left for pouring. Over the clay a covering of plaster of Paris or some other quick-setting plaster is built up, leaving a pouring opening, so as to form a jacket. As soon as the jacket has set, it is taken off the original article, and the water clay, which remains wet and does not adhere to the plaster, is removed. The jacket may then be placed over the original article again, and the space formerly occupied by the clay forms a mold space into which a plastic substance may be poured. For this purpose a good grade of molding glue is employed. This is usually a composition comprising glue and glycerine, fusible under heat. The original article, if a wood carving, may first advantageously be given the waxing treatment which I have described. The glue is melted and poured through the pouring opening about the surface of the article. When it has cooled, the plaster jacket and glue mold are removed together from the article. It is next my practice to harden the surface of the glue with some such substance as alum. When this has been done, the jacket and glue mold is turned with its open side up and one or more plaster casts made therein as desired, forming dummy articles, or plaster reproductions of the original.

The glue takes excellent impressions of the carving and grain of the wood, and these are reproduced perfectly in the plaster. If the original had undercuts, the glue composition will, by reason of its elasticity, pull out of these very readily, and will likewise pull out of undercuts reproduced in the plaster dummies, which may then be treated to fill up or remove them prior to the plating step. Two or more plaster dummies may usually be made from a glue impression: and a large number of glue impressions may be made of the original article without harming it in any way. Prior to the plating step the plaster dummies will be given a protective treatment such as a wax impregnation.

In plating upon such an article, I customarily employ the ordinary duplex acid copper sulphate solution, such as a solution containing twenty-eight ounces of copper sulphate, and ten ounces of commercial sulphuric acid per gallon. The Baumé of this solution is about twenty-two. I start my plating usually without agitation and at a current of about three-quarters of a volt. The current density which I employ for the first hour may be about fifteen amperes per square foot, which I may then increase to about thirty amperes per square foot for the next thirty hours or so. Afterward I use up to seventy-five amperes per square foot, and I may employ agitation with air to improve the quality of my deposit.

However, air agitation is disadvantageous in certain other respects, and I have found it advantageous instead to move the cathode slowly back and forth in the plating bath during deposition. It will be understood that these directions are exemplary only, and that other procedures may be used to produce relatively equivalent results. In commercial practice I have been employing copper as the electrodeposited metal. Other metals will serve, and in some instances may be preferable. Nickel or other metals will, under some circumstances, give a harder and more durable deposit than copper, and they may be used in whole or in part, or as a preliminary coating or surfacing which is subsequently backed up by copper or some other metal. I ordinarily continue my plating for about one hundred hours, or until I secure a good deposit, which is one-eighth of an inch or more at its thinnest point I have shown in Figure 1 a fragmentary sectional view of an original or master article such as one of wood, and which I have indicated by the numeral 1. Over the surface of this article there is shown upon a somewhat exaggerated scale a very thin coating of sensitizing substance 2 and the electroplated metallic coating which I have just described is indicated at 3.

When the coating has been formed as described, it is stripped or removed from the article and is incorporated in a mold structure so as to form a molding face, wall or surface thereof. This may be done in a number of ways, one of which is as follows: I take the stripped metallic shell or counterpart, and I build up about its edges a suitable frame. This may be done by spot welding strips of metal about the said edges, and the frame is designed to produce together with the face of the metallic shell which lay away from the master article during the electroplating process, a receptacle for a backing of metal hard enough to withstand the strains to which it will be subjected in molding. I prefer to back up the face of my metallic shell which lay next the master article, with sand or some other suitable support which will follow the configurations thereof, so that I may cast against the opposite face without destroying or distorting the said configurations. Having backed up the shell in this way I may next cast molten bronze against the opposite face and within the frame as described, whereupon I get a block or metallic slab suitable for forming a molding face.

The back of the metallic shell which I have described as being made from an original or master article, where that backing is accomplished through the use of bronze or other metal applied in a molten condition, may, and usually does produce a shrinkage in the article, which shrinkage may be compensated for in a number of ways. The face of the master article which is to be reproduced may be made somewhat oversized to allow for the said shrinkage, or shrinkage may be minimized or prevented by the backing of the metallic shell with some metal or material not applied thereto under high heat. For example, I may back up my metallic shell with a metal by spraying the metal thereon with a commercial apparatus adequate to this end, and then apply additional backing material such as bronze by casting it against the sprayed body.

It is possible to produce a backed plate without shrinkage merely by welding brass, bronze or the like against the copper electroplated plate with a gas flame. Ordinary brass rod may be employed for this purpose. The method is somewhat slower and is more expensive; but the results which it produces justify its cost.

In the manufacture of radio cabinets, the carved part is usually the front of a cabinet, and the carved part is primarily the part which I reproduce by an electroplated counter-part in the manner which I have just described. The sides of the cabinet are usually smooth, although they may have carving or other configurations impressed thereon by the same process and mechanism, as will be clear. Where a mold block is employed, which is of solid or rigidly bolted construction, it is, of course, essential to strip the article from the mold along the mold axis. Consequently, in the commercial manufacture of radio cabinets having smooth sides and a carved or ornamented front portion, I ordinarily use a solid block type female mold, and I employ the molding wall or surface made as I have hereinabove described as the bottom plate in my mold. For this purpose the back of the bronze casting may be machined or ground smooth as desired.

Figure 2:
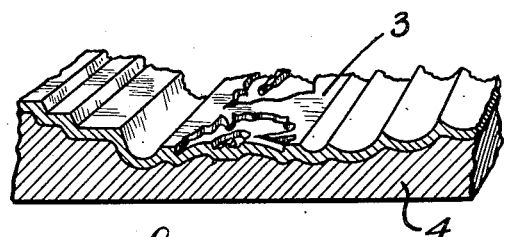
Figure 2 is a fragmentary cross-sectional view of a structure formed by stripping the metal from the master copy and forming it into the bed plate of a mold.
Figure 3:
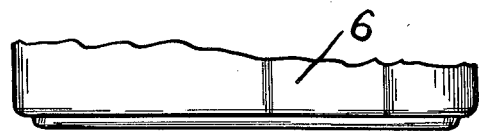
Figure 3 is a cross-sectional view of a mold suitable for the formation of my article and of the plunger used therewith.
Figure 3:
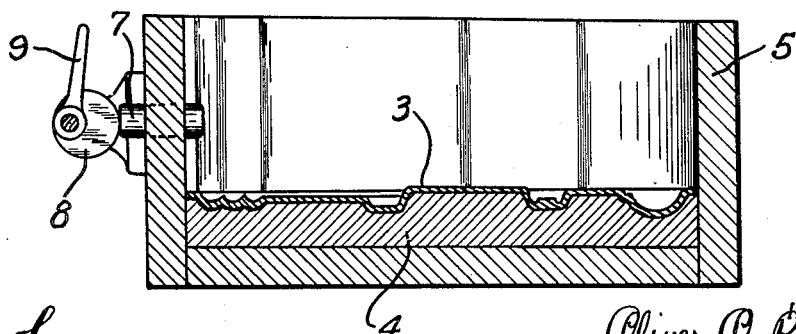

I have shown in Figure 2 a fragmentary cross sectional view of such a molding wall or part in which the copper or other metallic shell is again indicated at 3 and the bronze backing at 4. In Figure 3 I have indicated at 5 the walls of a female mold in which the bottom plate, shown in part in Figure 2, forms the bottom wall. The mold block 5 will be understood as fastened upon the bed of a suitable hydraulic press which may be equipped with a suitable ejecting ram underneath acting upon the bronze portion 4 of the bottom plate to raise the said bottom plate within the mold block, thereby ejecting an article. In this type of mold the bottom plate forms the front of the radio cabinet, while the top, the side walls and the bottom will be formed respectively, by the several side walls of the mold block 5.

There will be no back formed integral with such a radio cabinet; and I provide a plunger 6 of suitable shape to mold the interior of the cabinet, which plunger will be fastened upon the main ram of the hydraulic press so as to be forced into the mold block thereby. When the bottom portion of my mold block is formed of the bottom plate made as hereinabove described, and when a lump of suitable plastic material such as, say a lump of composition comprising bitumen fibers and a filler, is placed in the mold block cavity and the plunger is forced under pressure into the said mold cavity, the plastic composition will be caused to flow and fill all of the interstices thereof. More particularly it will be caused to conform to the configurations of the bottom plate and to receive thereby not only the general contour of the carved front of the original or master cabinet, but also all of those very fine markings that go to make up both the character of the carving thereon and the character of the natural grain therein.

Inasmuch as it is desirable in some instances to mold the bottom of the cabinet with perforations to admit air for cooling purposes, my mold may be provided with side plungers 7 operating through a wall of the female mold and actuated by eccentrics 8 having levers 9, or by other means adapted to advance them into or retract them from the central cavity of the mold. Where it is desired to mold metallic inserts into the articles which I am making, either the female or the male portions of the mold, or both, may be equipped with means for holding the said inserts during the molding operation. A stripper plate, not shown, may be used, if desired, in a position surrounding the male plunger so as to strip the molded article therefrom, since the said article usually rides out of the mold on the plunger. In cases where the article remains in the mold, it may be ejected therefrom by raising the bottom plate of the mold with the special ram provided for this purpose, as aforesaid.

By the method which I have described, the front of my cabinet is molded with all of the configurations aforesaid, the sides of my cabinet being molded against smooth, machined and polished walls of the female mold block. I can similarly mold configurations into the sides, top or bottom of my cabinet or other article by the use of a separable mold block, the side walls of which may be moved outwardly with respect to the article upon the withdrawal of the plunger, or I may use inserts in the mold removable with the article from which they may subsequently be stripped. Again, I may form up my article as described, and then before the plastic is entirely hardened or accompanied by a local replasticizing of the portions of the surface thereof which I may desire to impress, as by locally heating the said surface, I may, after the removal of the article from the mold, impress graining or other configurations into the plane surfaces thereof by supplementary molding, rolling or embossing operations. Instead of any of these expedients, however, I may finish the plane sides and top of my cabinet in the way in which I shall hereinafter describe.

As above indicated, however, the result of my molding operation is an article formed of a plastic composition, one face at least of the article having impressed configurations which may include not only a predetermined contour and arrangement of parts and masses, but also configurations in imitation of the natural surfaces of substances such as wood. My invention is not limited, of course, to the formations of facsimile of wood graining, but is equally adaptable to reproduction of the surface texture of other articles, such as leather, stone, textile articles, articles having stippled or mottled surfaces, and the like. In some instances the process which I have described may be used to produce articles of a desired configuration, contour and arrangement of parts in which, however, surface texture as such is not of primary importance, as where I am reproducing articles which have an involved contour but a smooth surface texture. Where the article has been formed of plastic composition, the surface color and appearance of which is suitable or satisfactory, the article may be regarded as finished; but other surface finishes may be placed thereon, some of which I shall hereinafter describe; and in the making out of dissimilar materials of simulations of natural articles, surface finishes are generally necessary inasmuch as the tonal values and finish of the molded article will not ordinarily be the same as that of the master article. This is particularly true in the manufacture of simulations of wood carving from masses of plastic composition comprising asphalt, bitumen and fibers. The molded articles as produced in the way I have described, while they have a surface configuration and texture which is desired, are dead black in appearance and do not at all look like a piece of carved wood. The procedure that I follow for giving the desired surface appearance, I shall now describe.

The molded article, after it has been stripped in the mold, is dressed or smoothed in any way desired. It is then treated with a ground coat which may be a ground coat of ordinary characteristics having the basic tone or color required for the character of wood being reproduced. Obviously the ground coat will vary in tone or color for different woods or other materials being reproduced. The ground coat will preferably have an alcohol solvent, but this is not necessary. It will be thoroughly dried. For ordinary ground coatings, four hours is sufficient. Where the required texture has been molded into the surface of the article as described, no smoothing operations such as knifing or sanding are necessary or advisable. The ground coat being thin, follows the texture and configurations of the molded surface and reproduces them in its surface. The next step is to spray or otherwise coat entirely over the molded surface a graining ink which, particularly if I spray it, I prefer to reduce to approximately the consistency of water with some such solvent as turpentine. This graining ink will ordinarily be much darker in color than the ground coat, and will be relied upon for two primary purposes after the treatment which I shall next describe.

The treatment comprises wiping off the graining ink with rags or otherwise, until the desired color is obtained. The graining ink is put on evenly so as to coat the entire surface, and particularly so as to follow all of the interstices and indentations of the surface configurations and texture. As the graining ink is wiped off with rags or otherwise, it is removed from the ground coating surface in part so as to expose at least the upper portions of the said ground coat surface, but the graining ink remains in the interstices, fissures and indentations of the surface. The surface may be left relatively dark or made quite light by removing more or less of the graining ink as desired, and more of it may be removed in one place than in another so as to produce lighter areas in portions of the article to give desired high lights or to produce the appearance of lightening through long use and wear. The effects for which I rely upon my graining ink are first, to accentuate and stress the configurations and indentations of the surface and the surface texture, and second, to give to the completed article the tone desired. The tone of the ground coating in its exposed portions, and the tone of the graining ink where it persists, determine, as will readily be understood, the visual aspect or general color tone of the grained surface. Were it not for the graining ink persisting in the wood grain markings or other indentations of the molded surface, the whole effect would be flat, and the graining itself would not be adequately visible because of the lack of color contrasts.

Figure 4:
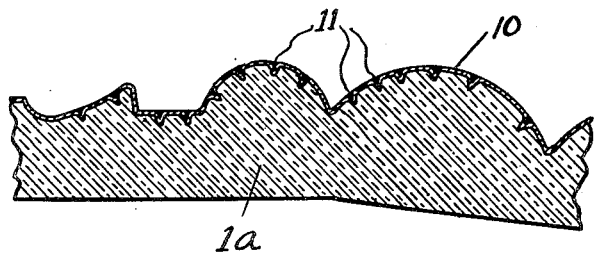
Figure 4 is a magnified fragmentary cross-sectional view of a molded surface of the article showing a step in the process of finishing the same.

In Figure 4 I have shown a portion of a molded article in section at this stage of my process. The body of the article 1a, which is a counterpart of the body of the master article 1, in Figure 1, is shown as coated with a ground coat 10, which, for the purpose of clearness, has been somewhat exaggerated in thickness. The graining ink is shown, after the surplus thereof has been wiped away, as persisting in the hollows or indentations molded into the material, in minute masses 11.

When the graining ink is dry, the surface may be finished with a coating of clear or nearly clear lacquer or varnish, and is then complete.

Figure 6:
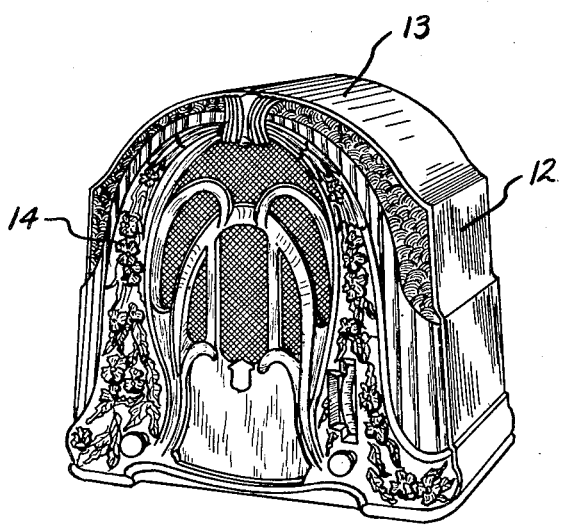
Figure 6 is a perspective view of an exemplary finished article.

A perspective view of the finished article is shown in Figure 6. This article is a radio cabinet having unornamented sides 12, and an unornamented top 13. The front or face of the cabinet has been indicated generally at 14, and is shown as embossed and treated as I hereinabove describe, in imitation not only of wood graining, but in exact counterpart of a carving in wood. This article is, of course, exemplary only, and is illustrative of a very large number of articles which I may make. In the particular instance, the character of the article demands that certain perforations be made in the front or face portion thereof, such as the openings in the grille for the loud speaker, and the opening to expose the dial which indicates the setting of the radio instrument. Since these perforations must be formed in the portion of the article lying next the bottom of the mold, where plungers, such as the plungers 7 in the side of mold, can be used, relatively thin fins of material are molded over these openings in the molding process and are subsequently removed. I have found that if I make the configuration of my plunger surface such that these fins covering the said openings are much thinner about their edges than at their center, a slight tap will usually be sufficient to remove them in one piece.

The process for the simulation of wood graining which I have just described is applicable to a molded surface in which the indentations corresponding to the graining markings of an original or master article have been impressed. In the formation of the particular cabinet which I have illustrated in Figure 6, this procedure is not applicable to the sides and top of the cabinet, which, because they have been stripped vertically from the mold, are, in the particular instance, unornamented and smooth in surface. Upon these surfaces I produce a representation of wood graining in another way, which I shall now describe.

In treating these surfaces I first see to it that the surface is smooth and flat, smoothing it where necessary. I may go over the surface if it happens to be rough or in any way, with a knifing primer or putty after I have sanded it. In articles made of the composition which I have set forth as exemplary, and in a carefully controlled molding process, this is ordinarily not necessary, because the surface is usually very good. I customarily apply to it, however, an oil base primer such as a combination primer and surfacer containing linseed and China-wood oil. When this has dried for say twelve hours, I give it a water rub; that is to say, a light rubbing with fine sandpaper and water. The material of the priming coat is ordinarily grayish, but the color is not particularly important. Over this I apply a ground coat, such as the ground coat I have hereinabove described. Upon this ground coat after it has dried, I then apply a pattern in graining ink of the particular wood grain or other surface finish which I desire to imitate. The pattern may be formed from a metal plate which has been printed upon from a photographic negative of a wood panel and then etched, so as to present a surface texture representative of the grain of the particular wood. I may apply a graining ink to this plate and then wipe it from the surface thereof. An impression roller is then run over the plate. The roller takes up from the little indentations thereof a transfer pattern of the wood grain. The impression roller is then passed over the unornamented surfaces of my article, which surfaces have been treated as described, with the ground coat. Again, I may make, by a process similar to that described for the reproduction of the carved face of a master article, a plate of satisfactory character without resorting to a photographic process. In doing this I may take a wood panel and make in wax or other suitable material, a reverse impression of the surface thereof. This impression is then sensitized or rendered conductive in the ways described or in other ways, and is then plated upon with copper or some other suitable metal. The metallic shell thus formed with a suitable backing where necessary, may then be used as an impression plate in forming a transfer pattern upon an impression cylinder.

An easier procedure, producing in many instances preferable results, comprises the use of a gum or glue roller having in its surface indentations corresponding to the grain of wood. Such a roller is inked, the ink removed until it remains only in the indentations, and the article treated therewith after the manner of intaglio printing.

When the transfer pattern of wood graining or other texture which I desire to produce upon the smooth surface of my article, has been placed thereon, and has thoroughly dried, I then coat the surface with a suitable transparent or translucent lacquer or varnish. I have found that a flat lacquer of the cellulosic type serves very well.

In this way I have produced a cabinet having sides and top with the appearance of polished wood surfaces and a front in the likeness of a highly carved and ornamented wooden panel in which the grain markings of the wood and the chisel markings of the carving have been faithfully reproduced. The general effect of these cabinets is highly artistic and attractive, while their cost is exceedingly low. The economy of my process of reproducing articles from a master or original article is such that a highly artistic and therefore very expensive master or original article may be employed, and the cost thereof so distributed over a very great number of reproductions thereof made by my process, that the cost of the said reproductions is kept very low.

It will be understood, of course, that I may make up more than one mold from my original or master article, or that I may make up additional molds from reproductions formed in the first mold, or other casts or reproductions of the original article otherwise formed.

Figure 5:
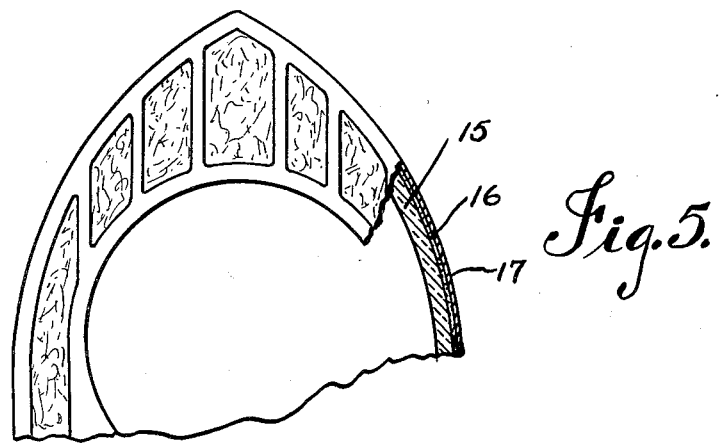
Figure 5 is a fragmentary cross-sectional view of a metallized article.

In some instances, instead of desiring to reproduce the surface texture, appearance and finish of non-metallic substances such as wood, I may desire to produce metallized articles in imitation of other articles which are metallized or formed of metal. When this is desired I produce the molded simulation of the shape and texture of the master or original article as hereinabove desired, and I then proceed to sensitize the surface thereof and plate it with the desired metal, afterward treating the metal in such a way as to give it the desired surface finish. Thus, where I desire to treat with metal the surface of an article molded from a composition of asphalt fibers and a filler (the article 15 of Figure 5), I may apply directly to such surface the sensitizing or bronzing spray 16, which I have hereinabove described, and then plate copper or some other metal upon the said surface as shown at 17. If the article has been molded of bakelite or some other material impervious to the solvent used in the sensitizing mixture, I may either render the surface of it conductive in some other manner, or I may coat the surface with shellac or some other base for the bronzing mixture, and then employ the sensitizer described. Where the composition is such as not to be impervious to the chemicals in the plating bath which I desire to employ, I will, of course, first treat the surface thereof to render it impervious. In most instances this may be done by a procedure entirely comparable to the original treatment of the wooden master article employed in the formation of radio cabinets as described, i. e., by treating the surface thereof in an oil or wax bath.

As exemplary of metals with which I may coat such an article, but of course without limitation, I may refer to copper, and I may follow with copper the procedure hereinabove outlined for the making of a metallic shell to be used as a mold part. The copper surface formed upon the article may be treated with the scratch brush, and then polished or burnished, afterwards being lacquered to prevent oxidation. Or it may be bronzed or given an oxidized copper surface, frequently referred to as a "statuary", by being first cleaned with a solution of cyanide of potassium, washed, and then dipped in a solution containing liver of sulphur. An irridescent surface may be made by first cleaning the metal surface of the article with the cyanide solution, and then directly dipping it into the liver of sulphur solution, afterward washing it. In the production of an antique surface, so-called, I first oxidize or bronze the surface as hereinabove described. I then high-light it with steel wool, and finally apply green and white china colors in turpentine to the desired shade, stippling the surface with a brush, a sponge, or with rags.

Modifications may be made in my invention without departing from the spirit thereof.

Having thus described my invention, what I claim as new and desire to secure by Letters Patent, is:—

1. The process of producing an article which is a faithful representation of a finished master article having surface details of various elevations, which details have peculiar surface texture of alternated depressions and elevations adapted to be finished in high and low lights by deposit of material in its depressions in excess of material on its elevations, which process comprises electrodeposition of a thin shell of metal on the surface details of the master article, to conform to said details and their peculiar surface texture, providing said shell with a reinforcing backing, then making the reinforced shell a part of a mold, then taking a mass of material normally rigid but capable of being made temporarily plastic, and making said material plastic and molding it, while plastic, against said shell, and then allowing the material to become rigid, and thereafter finishing the detailed and textured surface of said material in the manner in which the master article is adapted to be finished as aforesaid.

2. A process as set forth in claim 1 in which metal is used as the backing of the shell, and in which said metal is fused to said shell progressively, thus avoiding shrinkage of the shell incident to the cooling of the metal backing.

3. A process as set forth in claim 1, which is applied specifically to the production of an article which is a faithful representation of a hand-carved wood master article, and in which, for the electrodeposition of the shell, the surface of the wood master article is rendered electrically conductive while preserving the surface texture of the details, and in which the molded material is a fiber and bitumen composition and the molding step is carried out under the usual conditions attending the molding of such composition.

OLIVER O. RIESER.